Patented Feb. 22, 1949

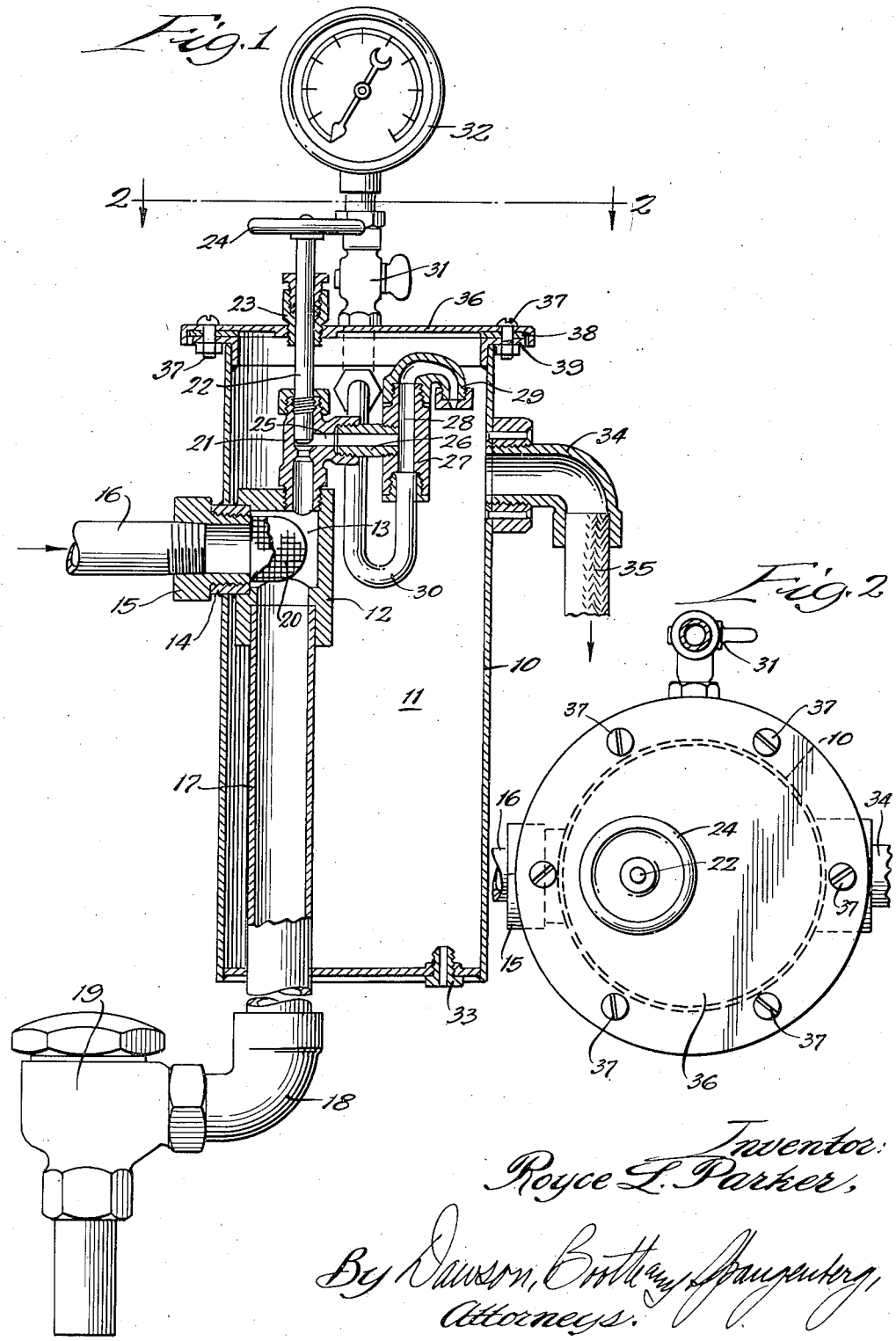

2,462,220

UNITED STATES PATENT OFFICE 2,462,220

STEAM TREATING APPARATUS

Royce L. Parker, Addison, Ill.

Application February 23, 1946, Serial No. 649,713

3 Claims. (Cl. 183—39)

This invention relates to steam treating apparatus or a foam and air space heater. The invention is particularly useful for removing moisture from steam so as to supply dry steam. The invention is useful in connection with pasteurizing equipment in which dry steam is supplied in the vapor space above the milk. The absence of suspended water droplets or moisture prevents dilution of the milk with water.

An object of the invention is to provide simple and efficient apparatus for the treatment of steam before it is sent to the pasteurizer or other apparatus so that the steam is free of entrained water droplets or moisture and may be used effectively as dry steam in the pasteurizing or other operations. Yet another object is to provide compact and efficient mechanism for the effective treatment of steam and the efficient elimination of droplets or moisture therein. Other specific objects and advantages will appear as the specification proceeds.

The invention is illustrated in a preferred embodiment, by the accompanying drawing, in which—

Figure 1 is a broken view in elevation and partly in vertical section of apparatus embodying my invention; and Fig. 2, a plan sectional view, the section being taken as indicated at line 2—2 of Fig. 1.

In the illustration given, 10 designates a casing which provides a main operating chamber 11. Within the casing 10 is a smaller casing member 12 which provides a small expansion chamber 13. The casing 12 is supported within the casing 10 by means of a threaded sleeve 14 pressed within the member 12 and internally engaged by the nut 15. The steam inlet pipe 16 is received within the nut 15.

Received within the lower portion of the casing 12 is a steam trap pipe 17 which extends through the bottom portion of casing 10 and is connected by the fitting 18 with the steam trap 19.

A screen member 20 is preferably secured within the chamber 13 so as to receive the incoming steam and remove a portion of the entrained water droplets, etc.

Threadedly connected to the upper portion of casing 12 is a valve fitting 21 controlled by the valve member 22. The valve stem 22 extends through a packing gland 23 and is provided at its upper end with a control handle 24. The fitting 21 is provided with an outlet passage 25. The fitting 26 merges with fitting 27 to form a substantially T-fitting. The upper portion of the fitting which provides a passage 28, communicating with passage 25, is connected to a nozzle fitting 29. The lower portion of fitting 27 is provided with a pipe 30 which leads through a control valve 31 to a pressure gauge 32.

It will be noted that the nozzle member 29 directs the steam downwardly toward an outlet drain fitting 33 in the bottom wall of casing 10. At an intermediate point between the nozzle 29 and outlet fitting 32 is the casing outlet 34. From the outlet 34, a pipe 35 leads to the vapor portion of the pasteurizer or other treating chamber which requires dry steam.

Operation

In the operation of the apparatus, the steam to be treated enters through pipe 16 into the inner chamber 13 where it meets the baffle or wire screening 20. In this chamber, the entrained droplets are removed and flow downwardly through the trap drain 17. The steam leaves chamber 13 through the passage 25 which is controlled by valve stem 22. In the passage 28 within fitting 27, the steam forms a divided stream, one portion of which extends through pipe 30 to operate the pressure gauge 32 while the other extends through the reduced-opening nozzle 29 from which it is discharged downwardly toward the outlet 33. Any free droplets or entrained moisture is thrown outwardly from the steam as it moves downwardly toward outlet 33. The dry steam which is recovered must reverse its course and pass upwardly and be drawn off through outlet 35.

It will be noted that the above operation provides in a single casing all of the operating mechanism. The thin walls of casing 10 provide an extensive area for the condensation and removal of moisture, while also the pipes and structures maintained within the casing 10 provide extensive areas for the condensation thereon of moisture and droplets and aid in the removal thereof.

Water collecting in the bottom of casing 13 drains off through the outlet fitting 33.

To facilitate access to the parts within the casing 10, I prefer to make the upper portion of the casing removable and I have, therefore, provided a removable head 36 which is secured to the casing 10 by means of bolts 37. The bolts or screws 37 extend through a gasket 38 and through a flange 39 provided by a tubular member welded to the top of casing 10. The packing gland 23 extends through the head 36 and provides a guide for the valve stem 22.

The apparatus is compact and the parts are in an arrangement which produces an effective removal of droplets and moisture from the steam.

While in the foregoing specification, I have set forth certain details as illustrating one mode in which the invention may be practiced, it will be understood that such details may be varied considerably by those skilled in the art without departing from the spirit of my invention.

I claim:

1. Apparatus for removing moisture and entrained water droplets from steam, comprising a casing providing a small expansion chamber, a trap pipe communicating with said expansion chamber extending downwardly below said casing, a pipe for conveying steam into said chamber, a screen in said expansion chamber and enveloping the inlet of said supply plant pipe, a conduit extending upwardly from said expansion chamber, a discharge nozzle connected to said upwardly extending conduit and directed downwardly for discharging steam toward the bottom of the casing, and an outlet pipe for dry steam extending laterally from said casing at right angles to the steam discharged from said nozzle.

2. Apparatus for removing moisture and entrained water droplets from steam, comprising a casing providing on one side a small expansion chamber having an upwardly extending conduit and a downwardly extending conduit in axial alignment, a supply pipe for discharging steam into said chamber between said oppositely extending conduits, a screen in said expansion chamber for the elimination of water carried by said steam, a nozzle connected to said upwardly extending conduit and turned so as to discharge steam downwardly from the upper portion of said casing toward the bottom of the casing, said casing being provided with a drain outlet at the bottom, and an outlet pipe for dry steam extending laterally from the casing and below said nozzle.

3. Apparatus for removing moisture and entrained water droplets from steam, comprising a casing providing interiorly a main chamber, said main chamber being provided with a drain outlet at its bottom, said expansion chamber being located centrally of said casing and having aligned conduits extending upwardly and downwardly from said expansion chamber, and supply pipe extending laterally into said expansion chamber for discharging steam therein between said oppositely extending conduits, a screen extending over said supply pipe, a nozzle connected to said upwardly extending conduit, said conduit being turned near the upper part of the casing to cause said nozzle to discharge steam downwardly adjacent one side of said main chamber, and an outlet fitting for dry steam extending from said side of the casing just below said discharge nozzle.

ROYCE L. PARKER.

REFERENCES CITED

The following references are of record in the file of this patent:

UNITED STATES PATENTS

| Number | Name | Date |
|---|---|---|
| 393,543 | Curtis | Nov. 27, 1888 |
| 426,880 | Taylor | Apr. 29, 1890 |
| 684,829 | Labadie | Oct. 22, 1901 |
| 1,714,647 | Vaughn | May 28, 1929 |